United States Patent
Hiramatsu et al.

[11] Patent Number: 5,966,664
[45] Date of Patent: Oct. 12, 1999

[54] COMMUNICATION CONTROL METHOD FOR REQUESTING PRIORITY DATA

[75] Inventors: Katsuhiko Hiramatsu; Mitsuru Uesugi, both of Yokohama, Japan

[73] Assignee: Matsushita Electric Industrial Co., Ltd., Osaka, Japan

[21] Appl. No.: 08/862,964

[22] Filed: Jun. 3, 1997

[30] Foreign Application Priority Data

Jun. 4, 1996 [JP] Japan .................................. 8-142034

[51] Int. Cl.[6] .................................................. H04Q 7/38
[52] U.S. Cl. .................... 455/515; 455/517; 455/422; 455/434
[58] Field of Search .................................. 455/515, 434, 455/509, 517, 422, 432, 436

[56] References Cited

U.S. PATENT DOCUMENTS

5,638,369  6/1997  Ayerst et al. .
5,752,193  5/1998  Scholefield et al. .

Primary Examiner—William Cumming
Assistant Examiner—Linwood C. Scott, Jr.
Attorney, Agent, or Firm—Venable; Robert J. Frank; Allen Wood

[57] ABSTRACT

When a second mobile machine requests the communication of priority data with a base station while a first mobile machine conducts the communication of non-priority data with the base station, the base station transmits wait information to the first mobile machine by using a down link control channel to control the first mobile machine to the waiting state and allocates the down link control channel to the second mobile machine to control the second mobile machine to conduct the communication of the priority data. When the communication of the priority data with the second mobile machine is completed, the base station transmits communication resumption information to the waiting first mobile machine by using the down link control channel to resume the communication of the non-priority data.

12 Claims, 8 Drawing Sheets

COMMUNICATION CONTROL METHOD FOR REQUESTING PRIORITY DATA

BACKGROUND OF THE INVENTION

1. Field of the Invention

The present invention relates to a communication control method, and more particularly to a communication control method in a digital mobile communication apparatus of TDMA/TDD (Time Division Multiple Access/Time Division Duplex) system.

2. Description of Related Art

Figure 1:
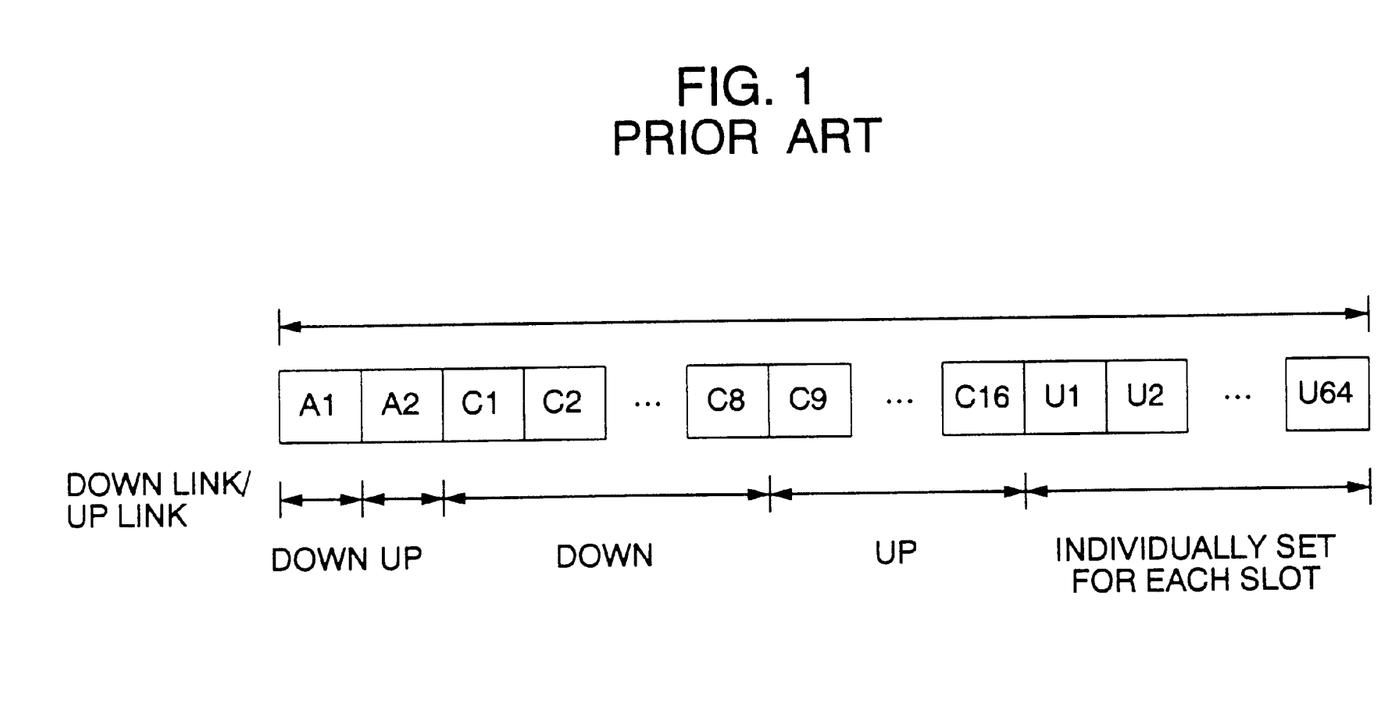
FIG. 1 illustrates a frame format used in a prior art digital mobile communication apparatus of the TDMA/TDD system.

In accordance with a frame format used in a digital mobile communication apparatus of the TDMA/TDD system, one frame comprises as follows, as shown in FIG. 1.

(1) A down link access channel $A1_{DOWN}$ and an up link access channel $A2_{UP}$ having a function as an access channel Ach used for communication of control information to establish frame synchronization of a mobile machine to a base station and to shift from the access channel Ach to a control channel Cch.

(2) Down link control channels $C1_{DOWN}$–$C8_{DOWN}$ and up link control channels $C9_{UP}$–$C16_{UP}$ having a function as a control channel Cch used for communication of control information to communicate data in a user channel Uch.

The down link control channels and the up link control channels are used in a combination such as a down link control channel $C1_{DOWN}$ and an up link control channel $C9_{UP}$, and a down link control channel $C2_{DOWN}$ and an up link control channel $C10_{UP}$.

(3) User channels U1–U64 having a function as a user channel Uch used for communication of data.

The user channel Uch is allocated for the down link and the up link separately for each slot. The base station indicates to the mobile machine by using the control channel Cch the particular slot used for the up link and the particular slot used for the down link in accordance with the data amounts of the up link and the down link to conduct the communication with the mobile machine.

Figure 2:
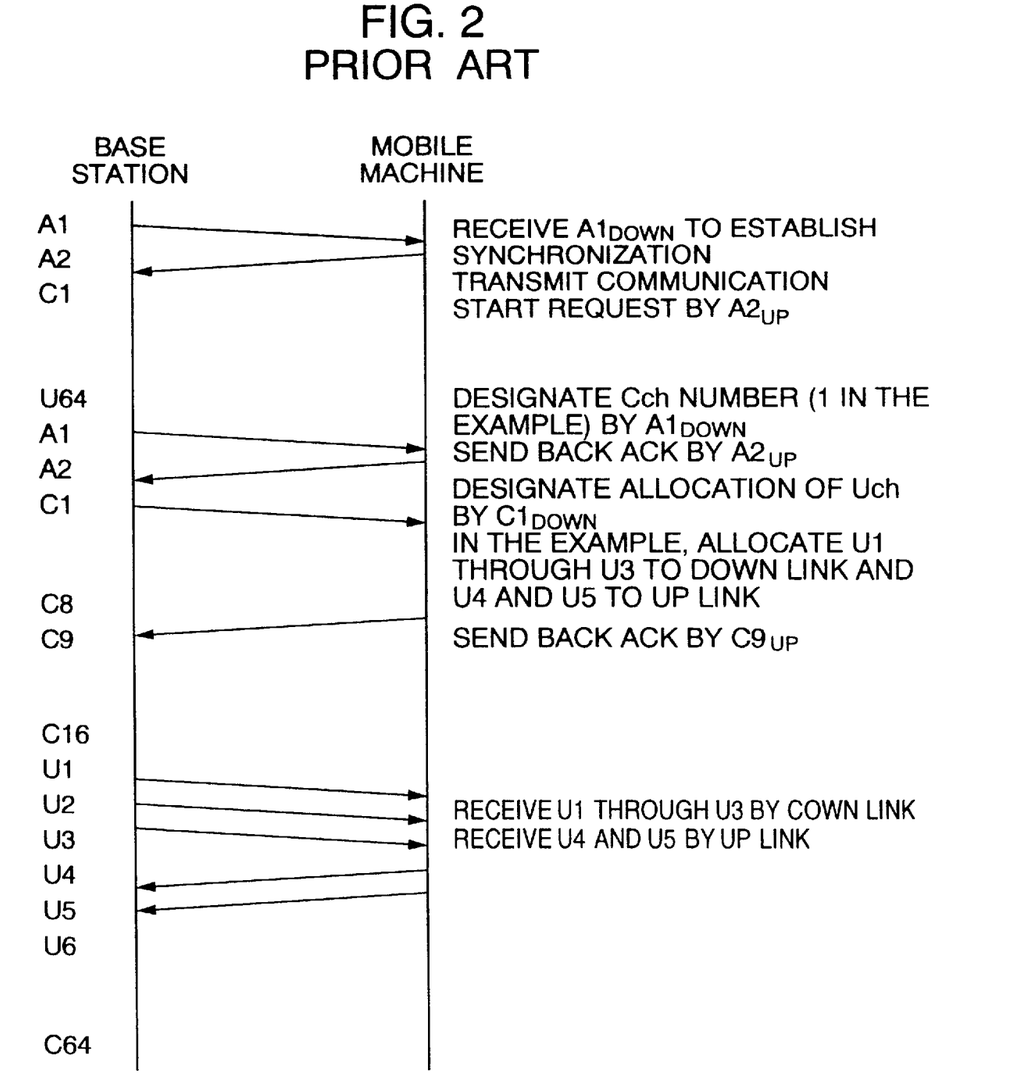
FIG. 2 shows a sequence chart for illustrating a prior art communication control method.

Referring to FIG. 2, a start protocol of the communication when such a frame format is used is explained. The mobile machine receives the down link access channel $A1_{DOWN}$ to establish the frame synchronization to the base station. Thus, the mobile machine may determine the particular slot used at the particular time in the base station. The mobile machine registers by using the up link access channel $A2_{UP}$. The base station transmits a communication start request by using the down link access channel $A1_{DOWN}$ and the mobile machine transmits the communication start request by using the up link access channel $A2_{UP}$. When the communication start request is communicated, the base station designates an available control channel Cch to the mobile machine by using the down link access channel $A1_{DOWN}$. In this instance, a combination of the down link access channel $C1_{DOWN}$ and the up link access channel $C9_{UP}$ is designated as the available control channel Cch. The mobile machine sends back an acknowledgement (ACK) thereto by using the up link access channel $A2_{UP}$. At this time, the access channel Ach is released. In the example shown in FIG. 2, the control channel Cch is designated by using the down link access channel $A1_{DOWN}$ but since there is only one set of access channel Ach in one slot, an N-channel super frame structure is adopted and a plurality of mobile machines are accommodated without conflict. Thereafter, the user channel Uch designation is indicated from the base station to the mobile machine by using the down link control channel $C1_{DOWN}$. In this instance, three user channel U1–U3 are allocated for the down link and two user channels U4 and U5 are allocated for the up link. The mobile machine sends back the acknowledgement (ACK) to the base station by using the up link control channel $C9_{UP}$. Thereafter, the communication is conducted by using the user channel Uch. Thereafter, the procedure of communication by designating the user channel Uch to be used by the control channel Cch and communicating by using the user channel Uch is repeated, and the communication is terminated by the control channel Cch, the access channel Ach of the super frame structure is received and the start of next communication is waited. The communication is conducted in such a protocol.

In the above communication control method, since there are eight sets of communication channel Cch, concurrent communication may be conducted for eight mobile machines. When all slots are busy, the information to be communicated are classified to priority data and non-priority data and the mobile machine which communicates only the non-priority data is controlled to the waiting state, and the mobile machine which communicates the priority data is controlled to be allocated with the control channel Cch. This control method is described below.

The mobile machine which communicates the priority data (referred to as a second mobile machine #2) issues a communication request to the base station by using the up link access channel $A2_{UP}$. The base station transmits wait information to the mobile machine which communicates the non-priority data (referred to as a first mobile machine #1). When the first mobile machine #1 receives the wait information, it releases the control channel Cch and reacquires the access channel (Ach) synchronization to receive the super frame, and waits for the start of communication. The base station notifies the allocation of the control channel Cch by using the down link access channel $A1_{DOWN}$. For this notice, the second mobile machine #2 sends back the acknowledgement (ACK) to the base station. Thereafter, it communicates the allocation information of the user channel Uch by using the control channel Cch to conduct the communication of information by the user channel Uch.

As described above, in the prior art communication control method, the mobile machine which communicates the non-priority data is controlled to the waiting state and the control channel Cch is allocated to the mobile machine which communicates the priority data so that the number of secured mobile machines which communicate the priority data is increased. Further, the waiting mobile machine receives the access channel Ach of the super frame structure so that the power consumption during the waiting is reduced. However, the waiting mobile machine must wait until it receives the access channel Ach of the super frame structure even if the control channel Cch becomes available, and the utilization efficiency of the control channel Cch is lowered.

SUMMARY OF THE INVENTION

It is an object of the present invention to provide a communication control method with an improved utilization efficiency of the control channel.

In accordance with the communication control method of the present invention, in order to achieve the above object, the first mobile machine which communicates the non-priority data is controlled to the waiting state while receiving the control channel yielded to the second mobile machine which communicates the priority data, so that the first mobile machine can resume the communication as soon as the second mobile machine completes the communication of the priority data.

In accordance with a first aspect of the present invention, there is provided a communication control method between a base station and first and second mobile machines when the second mobile machine requests the communication of priority data with the base station while the first mobile machine conducts the communication of non-priority data with the base station, comprising the steps in the base station of:

transmitting wait information to the first mobile machine by using a down link control channel to control the first mobile machine to the waiting state and allocating the down link control channel to the second mobile machine to control the second mobile machine to conduct the communication of the priority data; and when the communication of the priority data with the second mobile machine is completed, transmitting communication resumption information to said waiting first mobile machine by using said down link control channel to resume the communication of the non-priority data.

In accordance with a second aspect of the present invention, there is provided a communication control method between a base station and first and second mobile machines when the second mobile machine requests the communication of priority data with the base station while the first mobile machine conducts the communication of non-priority data with the base station, comprising the steps in the base station of:

transmitting wait information to the first mobile machine by using a first down link control channel to control the first mobile machine to the waiting state and allocating the first down link control channel to the second mobile machine to control the second mobile machine to conduct the communication of the priority data; and when a second down link control channel different from the first down link control channel is idle, controlling the second mobile machine to the waiting state for only one frame and transmitting slot movement information to the waiting first mobile machine to resume the communication by using the second down link control channel to resume the communication of the non-priority data.

In accordance with a third aspect of the present invention, there is provided a communication control method between a base station and first and second mobile machines when the second mobile machine requests the communication of priority data with the base station while the first mobile machine conducts the communication of non-priority data with the base station, comprising the steps in said base station of:

transmitting wait information to the first mobile machine by using a first down link control channel to control the first mobile machine to the waiting state and allocating the first down link control channel to the second mobile machine to control the second mobile machine to conduct the communication of the priority data; and when a second down link control channel different from the first down link control channel is idle, controlling the second mobile machine to the waiting state for only one frame and transmitting slot movement information to the waiting first mobile machine to resume the communication by using the second down link control channel to resume the communication of the non-priority data;

wherein when the waiting first mobile machine receives the slot movement information, the first mobile machine resumes the communication of the non-priority data in a next frame by using the second down link control channel.

DESCRIPTION OF THE PREFERRED EMBODIMENTS

First Embodiment

Figure 3:
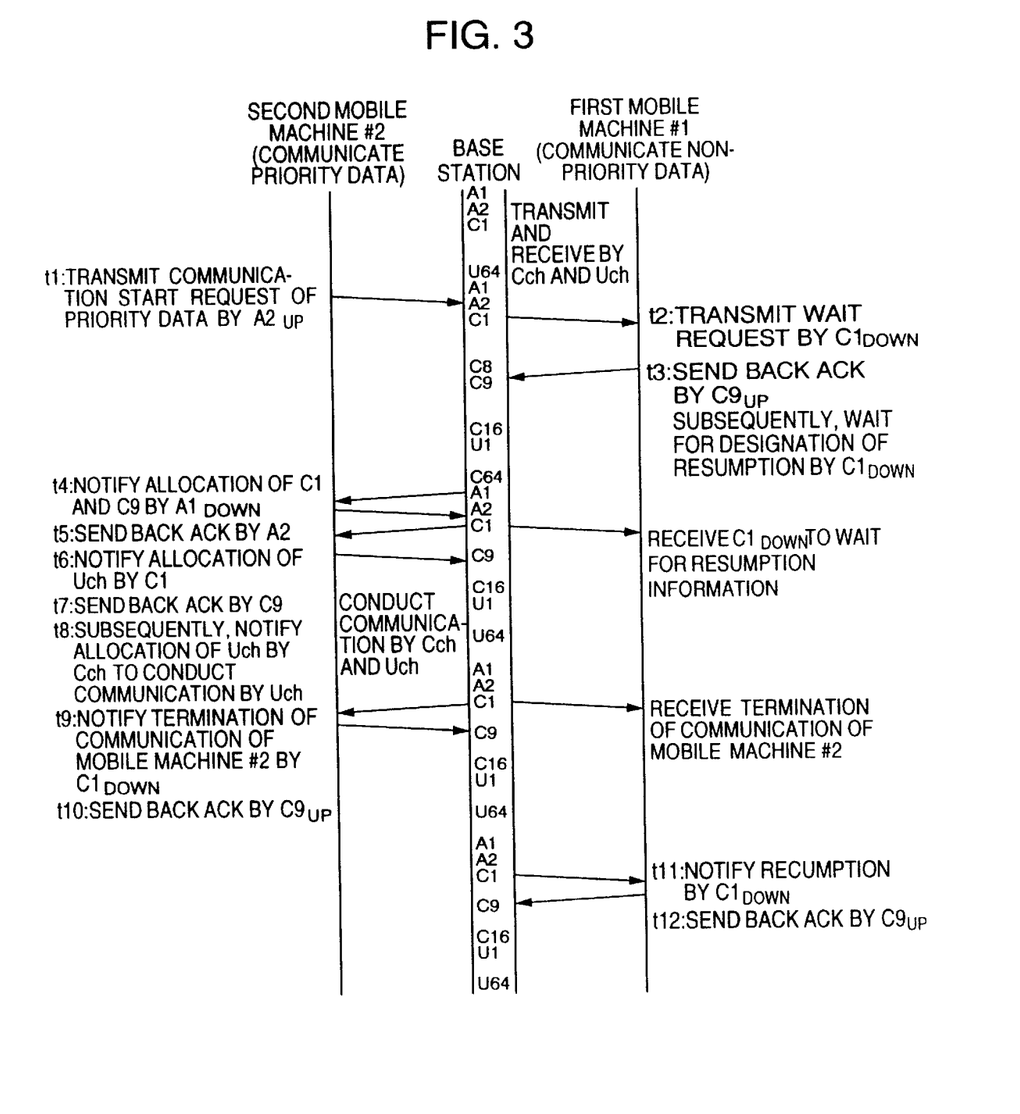
FIG. 3 shows a sequence chart for illustrating a communication control method in accordance with a first embodiment of the present invention.

Referring to FIG. 3, a communication control method in accordance with a first embodiment of the present invention is explained for an example in which when a base station conducts the communication of non-priority data with a first mobile machine #1, a second mobile machine #2 requests the start of communication of priority data to the base station by using the up link access channel $A2_{UP}$.

When the start of communication of the priority data is requested from the second mobile machine #2 (time t1), the base station determines a utilization status of the slot and allocates the control channel Cch to the second mobile machine #2. When all slots are busy, the base station transmits wait information to the first mobile machine #1, which communicates the non-priority data, by using the down link control channel $C1_{DOWN}$ to control the first machine #1 to the waiting state (time t2). When the first mobile machine #1 receives the wait information, it transmits the acknowledgement (ACK) to the base station by using the up link control channel $C9_{UP}$ and then monitors the down link control channel $C1_{DOWN}$ to the wait for the communication resumption information (time t3). Then, the base station notifies to the second mobile machine #2 the allocation of the down link control channel $C1_{DOWN}$ and the up link control channel $C9_{UP}$ by using the down link access channel $A1_{DOWN}$ (time t4). When the second mobile machine #2 receives the notice, it transmits the acknowledgement (ACK) to the base station by using the up link access channel $A2_{UP}$ and is ready to receive the down link control channel $C1_{DOWN}$ (time t5). At this time, the access channel Ach is released. Then, the base station transmits the allocation of the user channel Uch to the second mobile machine #2 by using the down link control channel $C1_{DOWN}$ (time t6). When the second mobile machine #2 receives the allocation of the user channel Uch, it transmits the acknowledgement (ACK) to the base station by using the up link control channel $C9_{UP}$ (time t7). Thus, the communication of the non-priority data between the base station and the second mobile machine #2 is started (time t8).

When the communication of the priority data with the second mobile machine #2 is completed, the base station notifies the termination of the communication to the second mobile machine #2 by using the down link control channel $C1_{DOWN}$ (time t9). When the second mobile machine #2 receives the notice, it transmits the acknowledgement (ACK) to the base station by using the up link control channel $C9_{UP}$ (time t10). Then, the base station transmits the communication resumption information to the first mobile machine #1 by using the down link control channel $C1_{DOWN}$ (time t11). When the first mobile machine #1 receives the notice, it transmits the acknowledgement (ACK) to the base station by using the up link control channel $C9_{UP}$ (time t12). Thus, the communication of the non-priority data between the base station and the first mobile machine #1 is resumed.

In this manner, in the communication control method of the present embodiment, since the waiting first mobile machine #1 waits for the communication resumption information transmitted from the base station by using the down link control channel, which is used for the communication of the non-priority data with the base station, to resume the communication of the non-priority data, it can resume the communication in a shorter time than the method of resuming the communication of the non-priority data after receiving the communication resumption information by using the access channel Ach of the super frame structure.

Second Embodiment

In the communication control method of the first embodiment described above, the first mobile machine #1 continuously receives even during the waiting the control channel Cch, which is used before the shift to the waiting, to wait for the communication resumption information, but when the communication time of the second mobile machine #2 is long, the wait time of the first mobile machine #1 is long. Thus, in the communication control method in accordance with the second embodiment of the present invention, the base station looks for another idle slot and controls the second mobile machine #2 to the waiting state for one frame by using the down link control channel Cch and transmits slot movement information to the first mobile machine #1. When the first mobile machine #1 receives the slot movement information, it moves to the slot designated by the base station. Thus, the waiting first mobile machine #1 can resumes the communication in a shorter time.

Figure 4:
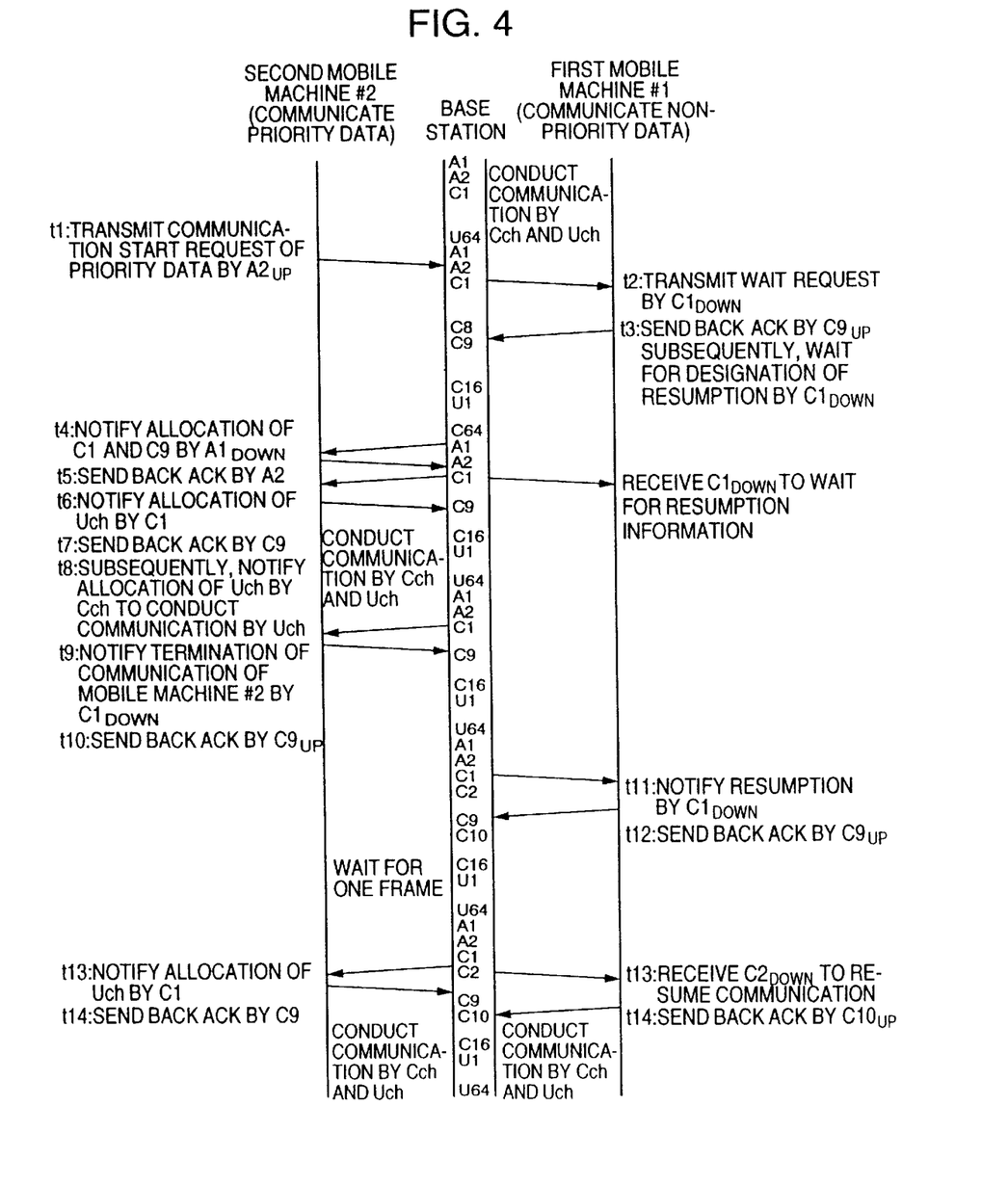
FIG. 4 shows a sequence chart for illustrating a communication control method in accordance with a second embodiment of the present invention.

Referring to FIG. 4, the communication control method of the present embodiment is explained for an example in which when the base station conducts the communication of the non-priority data with the first mobile machine #1, the second mobile machine #2 requests the start of the communication of the priority data to the base station by using the up link access channel $A2_{UP}$ is explained.

When the request of the start of the communication of the priority data is issued from the second mobile machine #2 (time t1), the base station determines a utilization status of the slots to allocate the control channel Cch to the second mobile machine #2. When all slots are busy, the base station transmits the wait information by using the down link control channel $C1_{DOWN}$ the first mobile machine #1, which conducts the communication of the non-priority data, to control the first mobile machine #1 to the waiting state (time 2). When the first mobile machine #1 receives the wait information, it transmits the acknowledgement (ACK) to the base station by using the up link control channel $C9_{UP}$ and then monitors the down link control channel $C1_{DOWN}$ to wait for the communication resumption information from the base station (time t3). Then, the base station notifies to the second mobile machine #2 the allocation of the down link control channel $C1_{DOWN}$ and the up link control channel $C9_{UP}$ by using the down link access channel $A1_{DOWN}$ (time t4). When the second mobile machine #2 receives the notice, it transmits the acknowledgement to the base station by using the up link access channel $A2_{UP}$ and then is ready to receive the down link control channel $C1_{DOWN}$ (time t5). At this time, the access channel Ach is released. Then, the base station transmits the allocation of the user channel Uch to the second mobile machine #2 by using the down link control channel $C1_{DOWN}$ (time t6). When the second mobile machine #2 receives the allocation of the user channel Uch, it transmits the acknowledgement (ACK) to the base station by using the up link control channel $C9_{UP}$ (time t7). Thus, the communication of the non-priority data between the base station and the second mobile machine #2 is started (time t8).

When an idle slot becomes available during the communication with the second mobile machine #2, the base station transmits the wait information for one frame to the second mobile machine #2 by using the down link control channel $C1_{DOWN}$ (time t9). When the second mobile machine #2 receives the wait information, it transmits the acknowledgement (ACK) to the base station by using the up link control channel $C9_{UP}$ (time t10). The base station transmits the slot movement information (in the present instance, the information indicating the movement to the down link control channel $C2_{DOWN}$) to the first mobile machine #1 by using the down link control channel $C1_{DOWN}$ (time t11). When the first mobile machine #1 receives the slot movement information, it transmits the acknowledgement (ACK) to the base station by using the up link control channel $C9_{UP}$ (time t12). During this period, the second mobile machine #2 is in the waiting state.

Then, the base station notifies the allocation of the user channel Uch to the second mobile machine #2 by using the down link control channel $C1_{DOWN}$ and transmits the communication resumption information to the first mobile machine #1 by using the down link control channel $C2_{DOWN}$ (time t13). When the second mobile machine #2 receives the notice, it transmits the acknowledgement (ACK) to the base station by using the up link control channel $C9_{UP}$, and when the first mobile machine #1 receives the communication resumption information, it transmits the acknowledgement (ACK) to the base station by using the up link control channel $C10_{UP}$ (time t14). Thus, the communication of the priority data between the base station and the second mobile machine #2 and the communication of the non-priority data between the base station and the first mobile machine #2 are resumed.

Third Embodiment

In the communication control method of the first embodiment described above, the first mobile machine #1 continuously receives the control channel Cch, which is used before the shift to the waiting, even during the waiting to wait for the communication resumption information, but when the communication time of the second mobile machine #2 is long, the wait time of the first mobile machine #1 is long. Thus, in the communication control method in accordance with the third embodiment of the present invention, the base station looks for another idle slot and transmits the slot movement information to the first mobile machine #1 and the second mobile machine #2 by using the down link control channel Cch. When the first mobile machine #1 receives the slot movement information, it moves to the slot designated by the base station. Thus, the waiting first mobile machine #1 can resume the communication in a shortest time.

Figure 5:
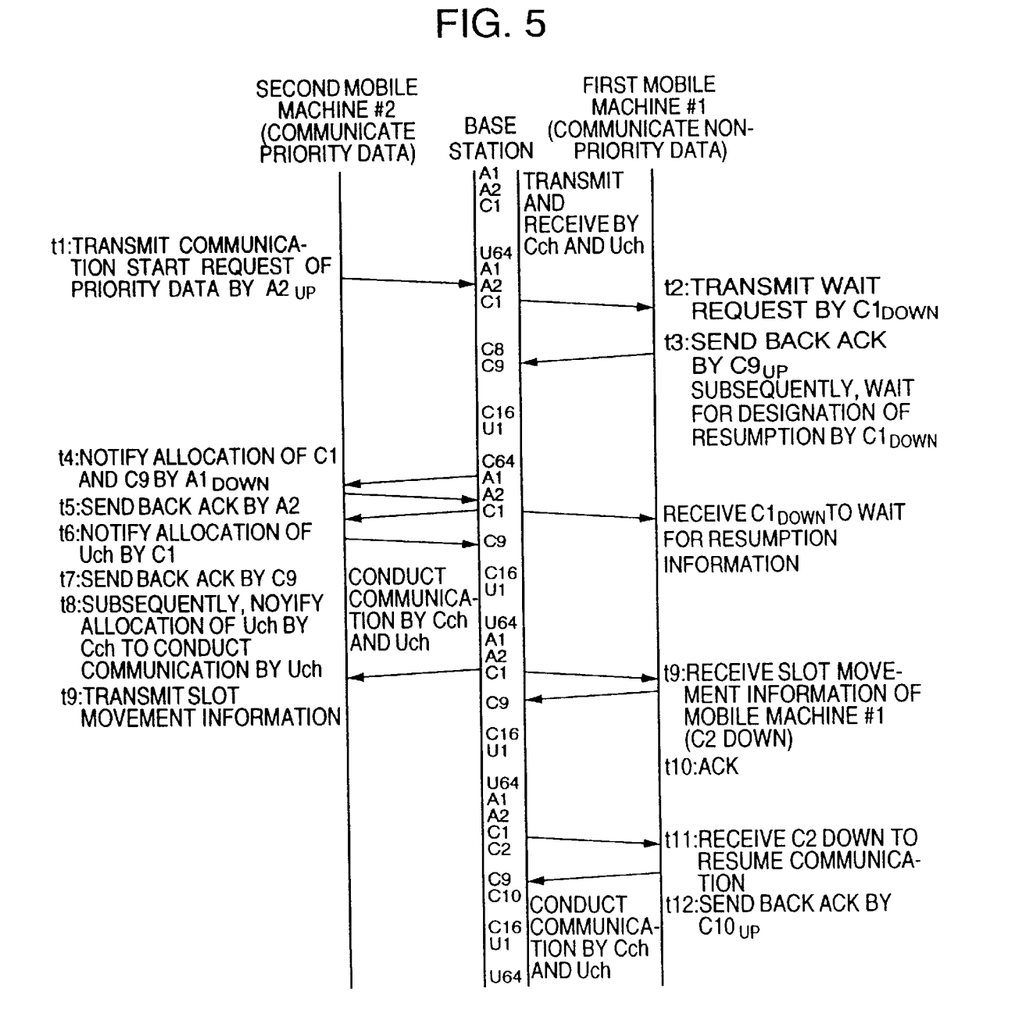
FIG. 5 shows a sequence chart for illustrating a communication control method in accordance with a third embodiment of the present invention.

Referring to FIG. 5, the communication control method in accordance with the present invention is explained for an example in which when the base station conducts the communication of the non-priority data with the first mobile machine #1, the second mobile machine #2 requests the start of the communication of the priority data to the base station by using the up link access channel $A2_{UP}$.

When the request for the start of the communication of the priority data is issued from the second mobile machine #2 (time t1), the base station determines a utilization status of the slots to allocate the control channel Cch to the second mobile machine #2. When all slots are busy, the base station transmits the wait information to the first mobile machine #1, which conducts the communication of the non-priority data, by using the down link control channel $C1_{DOWN}$ to control the first mobile machine #1 to the waiting state (time t2). When the first mobile machine #1 receives the wait information, it transmits the acknowledgement (ACK) to the base station by using the up link control channel $C9_{UP}$ and then monitors the down link control channel $C1_{DOWN}$ to the wait for the communication resumption information from the base station (time t3). Then, the base station notifies the allocation of the down link control channel $C1_{DOWN}$ and the up link control channel $C9_{UP}$ to the second mobile machine #2 by using the down link access channel $A1_{DOWN}$ (time t4). When the second mobile machine #2 receives the notice, it transmits the acknowledgement (ACK) to the base station by using the up link access channel $A2_{UP}$ and then is ready to receive the down link control channel $C1_{DOWN}$ (time t5). At this time, the access channel Ach is released. Then, the base station transmits the allocation of the user channel Uch to the second mobile machine #2 by using the down link control channel $C1_{DOWN}$ (time t6). When the second mobile machine #2 receives the allocation of the user channel Uch, it transmits the acknowledgement (ACK) to the base station by using the up link control channel $C9_{UP}$ (time t7). Thus, the communication of the priority data between the base station ad the second mobile machine #2 is started (time t8).

When an idle slot becomes available during the communication with the second mobile machine #2, the base station transmits the information of the down link control channel $C1_{DOWN}$ accompanied by the slot movement information (in the present instance, the information indicating the movement to the down link control channel $C2_{DOWN}$) to the first mobile machine #1 and the second mobile machine #2 (time t9). When the second mobile machine #2 receives the slot movement information, it disregards the slot movement information and continues the communication of the priority data as before. On the other hand, when the first mobile machine #1 receives the slot movement information, it transmits the acknowledgement (ACK) to the base station by using the up link control channel $C9_{UP}$ (time t10).

Then, the base station transmits the communication resumption information to the first mobile machine #1 by using the down link control channel $C2_{DOWN}$ (time t11). When the first mobile machine #1 receives the communication resumption information, it transmits the acknowledgement (ACK) to the base station by using the up link control channel $C10_{UP}$ (time t12). Thus, the communication of the non-priority data between the base station and the first mobile machine #1 is resumed while the communication of the priority data between the base station and the second mobile machine #2 is continued.

Fourth Embodiment

In the communication control methods in accordance with the first to third embodiments described above, not the access channel of the supper frame structure but the control channel is continuously received to allow quick return from the wait state to the communication state. However, in a communication apparatus such as a portable terminal, power consumption is large during the continuous reception even if it is merely in the reception state. Thus, in the communication control method in accordance with the fourth embodiment of the present invention, the control channel used to transmit the communication start information is transmitted to the waiting first mobile machine at a predetermined frame period to control it to intermittently receive the communication start information to reduce the power consumption.

Figure 6:
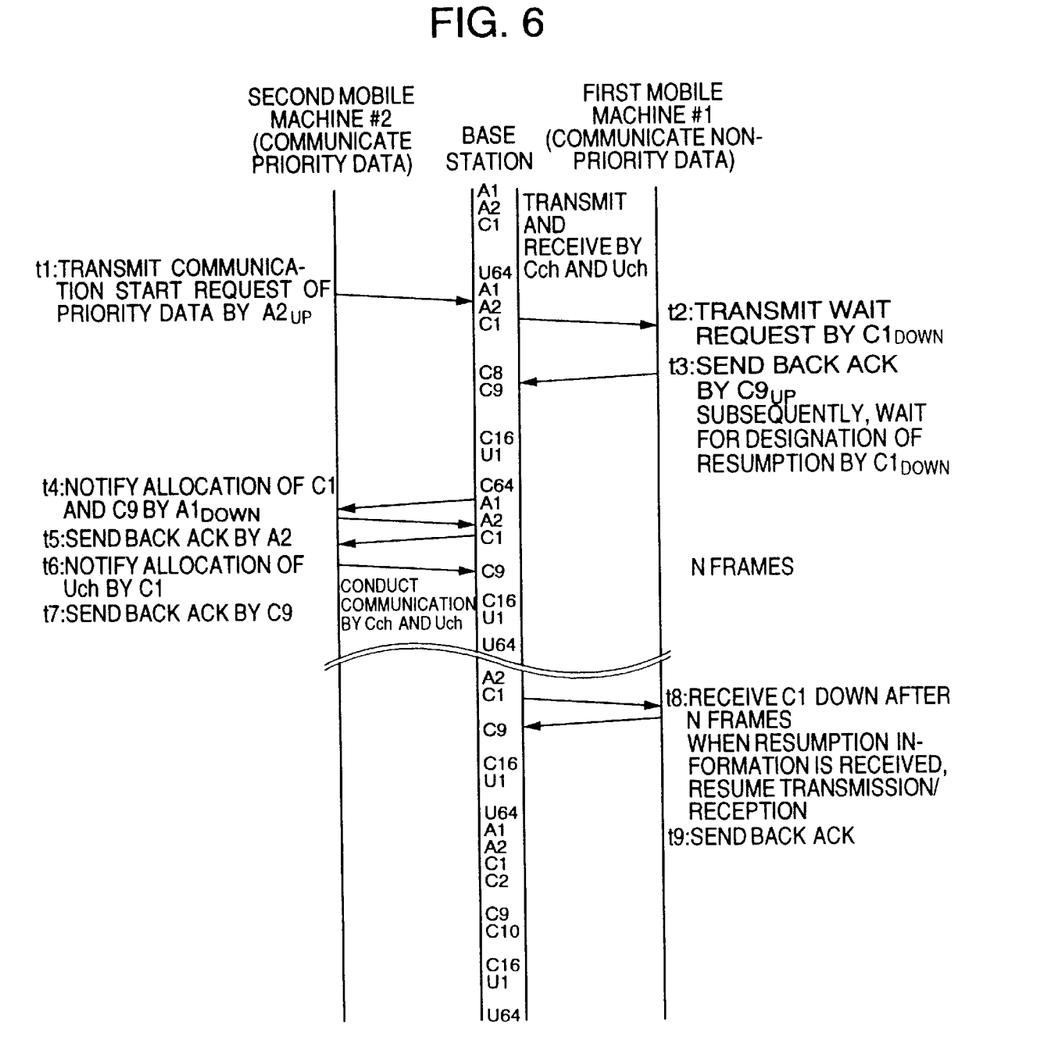
FIG. 6 shows a sequence chart for illustrating a communication control method in accordance with a fourth embodiment of the present invention.

Referring to FIG. 6, the communication control method in accordance with the present invention is explained for an example in which when the base station conducts the communication of the non-priority data with the first mobile machine #1, the second mobile machine #2 requests the start of the communication of the priority data to the base station by using the up link access channel $A2_{UP}$.

When the request for the start of the communication of the priority data is issued from the second mobile machine #2 (time t1), the base station determines a utilization status of the slots to allocate the control channel Cch to the second mobile machine #2. When all slots are busy, the base station transmits the wait information and a reception period (in this example, N frames) to intermittently receive the control channel Cch to the first mobile machine #1 which conducts the communication of the non-priority data by using the down link control channel $C1_{DOWN}$ and controls the first mobile machine #1 to wait (time t2). The reception period is set to be shorter than the period of the super frame of the access channel Ach. When the first mobile machine #1 receives the wait information and the reception period, it transmits the acknowledgement (ACK) to the base station by using the up link control channel $C9_{UP}$ and then monitors the down link control channel $C1_{DOWN}$ at the reception period to wait for the communication resumption information from the base station (time t3). Then, the base station notifies the allocation of the down link control channel $C1_{DOWN}$ and the up link control channel $C9_{UP}$ to the second mobile machine #2 by using the down link access channel $A1_{DOWN}$ (time t4). When the second mobile machine #2 receives the notice, it transmits the acknowledgement (ACK) to the base station by using the up link access channel $A2_{UP}$ and then is ready to receive the down link control channel $C1_{DOWN}$ (time t5). At this time, the access channel Ach is released. Then, the base station transmits the allocation of the user channel Uch to the second mobile machine #2 by using the down link control channel $C1_{DOWN}$ (time t6). When the second mobile machine #2 receives the allocation of the user channel Uch, it transmits the acknowledgement (ACK) to the base station by using the up link control channel $C9_{UP}$ (time t7). Thus, the communication of the priority data between the base station and the second mobile machine #2 is started.

When the communication of the priority data with the second mobile machine #2 is completed, the base station transmits the communication resumption information to the first mobile machine #1 by using the down link control channel $C1_{DOWN}$ in synchronism with the reception period (in the example, N frames) (time t8). When the first mobile machine #1 receives the communication resumption information, it transmits the acknowledgement (ACK) to the base station by using the up link control channel $C9_{UP}$ (time t9). Thus, the communication of the non-priority data between the base station and the first mobile machine #1 is resumed.

Fifth Embodiment

In the communication control method in accordance with the fourth embodiment described above, the waiting first mobile machine intermittently receives the control channel at the predetermined frame period. Accordingly, while the waiting first mobile machine does not conduct the intermittent reception, it is ready to receive the idle slot information of the adjacent base station which is adjacent to the base station. Thus, in the communication control method in accordance with the fifth embodiment of the present invention, the waiting first mobile machine receives the idle slot information of the adjacent base station while it does not conduct the intermittent reception of the control channel at the predetermined frame period, and when the idle slot is available, it conducts the communication with the adjacent base station by using the idle slot so that efficient hand-over is executed.

The communication control method in accordance with the present embodiment is now explained for an example in which when the base station (for the purpose of simplification of the explanation, it is referred to as base station #1) conducts the communication of the non-priority data with the first mobile machine #1, the second mobile machine #2 requests the start of the communication of the priority data to the base station #1 by using the up link access channel $A2_{UP}$. The process up to the transmission of the wait information and the period (reception period) to receive the control channel Cch from the base station #1 to the first mobile machine #1 to control the first mobile machine #1 to the waiting state and the allocation of the control channel Cch to the second mobile machine #2 to conduct the communication with the second mobile machine #2 is similar to that of the communication control method in accordance with the fourth embodiment described above and hence the subsequent process is explained with reference to FIG. 7.

Figure 7:
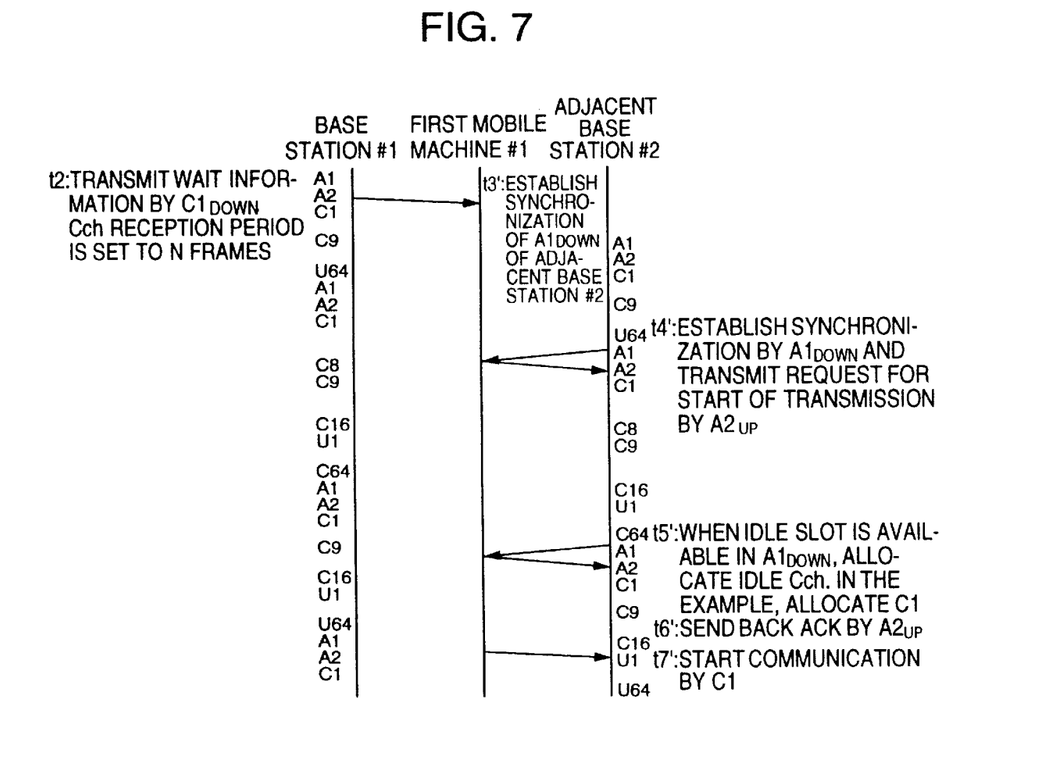
FIG. 7 shows a sequence chart for illustrating a communication control method in accordance with a fifth embodiment of the present invention.

At a time t2, the base station #1 transmits the wait information and the period (reception period) to receive the control channel Cch to the first mobile machine #1 to control the first mobile machine #1 to the waiting state, and the first mobile machine #1 continuously receives the electromagnetic wave from the adjacent base station #2 to detect the down link access channel $A1_{DOWN}$ to establish the frame synchronization with the adjacent base station #2 (time t3'). The frame synchronization with the adjacent base station #2 is established because the base stations usually are not fully synchronized. When the frame synchronization is established, the first mobile machine #1 transmits the request for the start of the transmission to the adjacent base station #2 by using the up link access channel $A2_{UP}$ (time t4'). When the idle slot is available, the adjacent base station #2 transmits the communication start information to the first mobile machine #1 by using the down link access channel $A1_{DOWN}$ and allocates the idle control channel Cch (in the present example, the control channel C1) (time t5'). When the first mobile machine #1 receives the communication start information, it transits the acknowledgement (ACK) by using the up link access channel $A2_{UP}$ (time t6') and then starts the communication with the adjacent base station #2 by using the control channel Cch and the user channel Uch (time t7'). The first mobile machine #1 is constructed to be provided with a frame counter for the base station #1 and receive the communication resumption information by using the down link control channel $Cch_{DOWN}$ from the base station #1.

Sixth Embodiment

The communication control method in accordance with the sixth embodiment of the present invention is different from the communication control method in accordance with the fifth embodiment of the present invention described above in that when the first mobile machine #1 shifts to the adjacent base station #2, it transmits the information of the shift to the adjacent base station #2 (base station movement information) to the base station #1. Namely, in the hand-over procedure in the communication control method in accordance with the fifth embodiment described above, the mobile machine may efficiently switch the base station but since the base station which is disconnected from the mobile machine after the switching does not have the information of the disconnection of the mobile machine, the base station continues to receive the up link control channel $Cch_{UP}$ and only when the synchronization is lost, it allocates the control channel slot to another mobile machine. Accordingly, a time is wasted before the control channel slot is allocated to the other mobile machine. The communication control method in accordance with the sixth embodiment of the present invention eliminates the wasteful time and allows the efficient allocation of the control channel slot by the base station, which indicates the wait state, to the other mobile machine.

The communication control method in accordance with the sixth embodiment of the present invention is now explained for an example in which when the base station #1 conducts the communication of the non-priority data with the first mobile machine #1, the second mobile machine #2 requests the start of the communication of the priority data to the base station #1 by using the up link access channel $A2_{UP}$. Since the process up to the transmission of the wait information and the period (reception period) to receive the control channel Cch from the base station #1 to the first mobile machine #1 to control the first mobile machine #1 to the waiting state and the allocation of the control channel Cch to the second mobile machine #2 to conduct the communication with the second mobile machine #2 is similar to that in the communication control method in accordance with the fourth embodiment described above, the subsequent process is explained with reference to FIG. 8.

Figure 8:
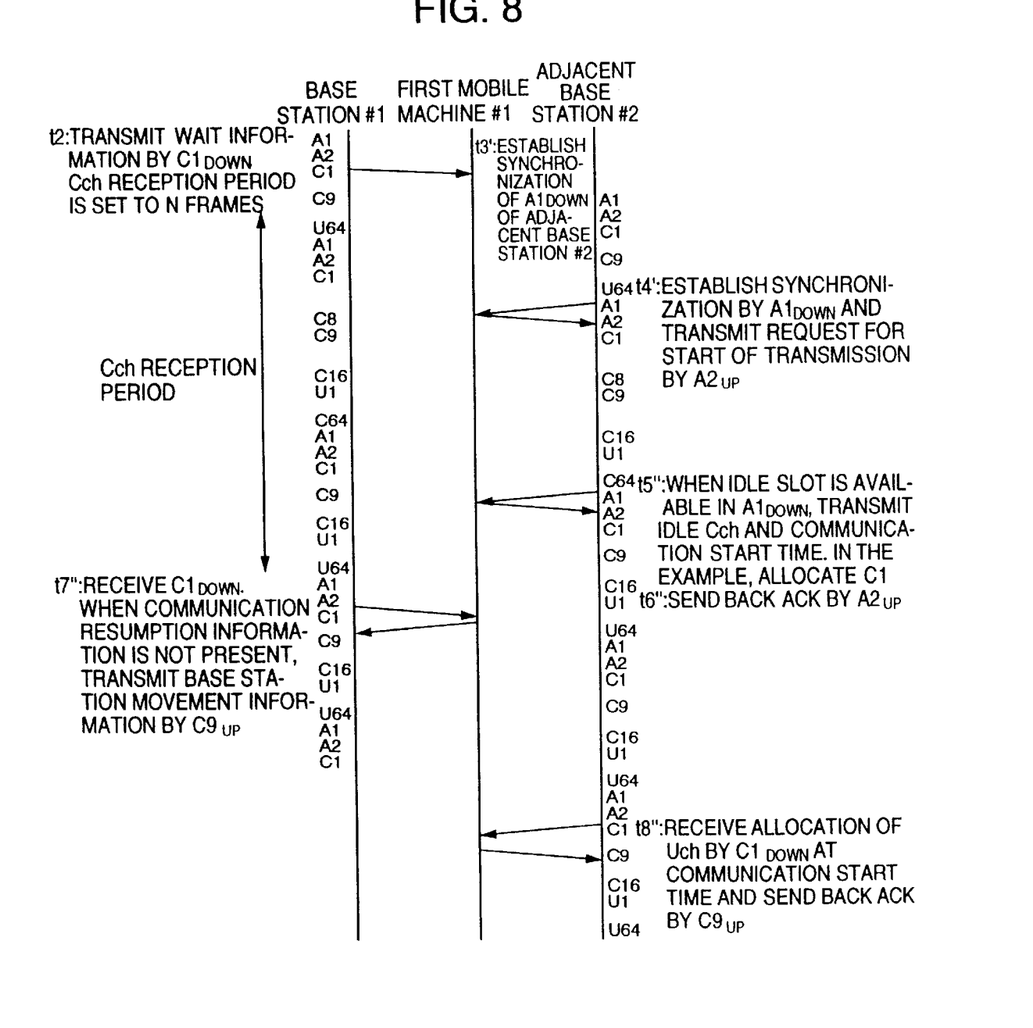
FIG. 8 shows a sequence chart for illustrating a communication control method in accordance with a sixth embodiment of the present invention.

At a time t2, the base station #1 transmits the wait information and the period (reception period) to receive the control channel Cch to the first mobile machine #1 to control the first mobile machine #1 to the waiting state, and the first mobile machine #1 continuously receives the electromagnetic wave from the adjacent base station #2 to detect the down link access channel $A1_{DOWN}$ to establish the frame synchronization with the adjacent base station #2. The frame synchronization with the adjacent base station #2 is established because the base stations are usually not fully synchronized. When the frame synchronization is established, the first mobile machine #1 transmits the request for the start of the communication to the adjacent base station #2 by using the up link access channel $A2_{UP}$ (time t4'). When the idle slot is available, the adjacent base station #2 transmits the communication start information to the first mobile machine #1 by using the down link access channel $A1_{DOWN}$ to allocate the idle control channel Cch (in the present example, the control channel C1) and transmits the communication start time (the time at which the control channel Cch to start the communication is received, for example, a time corresponding to one frame) (time t5"). The communication start time is transmitted to secure the time for the first mobile machine #1 to transmit the base station movement information to the base station #1. When the first mobile machine #1 receives the communication start information, it transits the acknowledgement (ACK) by using the up link access channel $A2_{UP}$ (time t6"). Then, the first mobile machine #1 transmits the base station movement information to the base station #1 by using the next up link control channel $C9_{UP}$ for the communication with the base station #1 (time t7"). The first mobile machine #1 receives the control channel Cch designated by the adjacent base station #2 to start the communication with the adjacent base station #2 by using the control channel Cch and the user channel Uch (time t8'). At this time, the first mobile machine #1 transmits the acknowledgement (ACK) to the adjacent base station #2 by using the up link control channel $C9_{UP}$. Since the first mobile machine #1 is moved to the adjacent base station #2, the base station #1 allocates the control channel Cch, which was to be used by the first mobile machine #1, to other mobile machine.

What is claimed is:

1. A communication control method between a base station and first and second mobile machines when said second mobile machine requests communication of priority data with said base station while said first mobile machine conducts communication of non-priority data with said base station, comprising the steps in said base station of:

transmitting wait information to said first mobile machine by using a down link control channel to control said first mobile machine to a waiting state and allocating said down link control channel to said second mobile machine to control said second mobile machine to conduct the communication of the priority data; and when the communication of the priority data with said second mobile machine is completed, transmitting communication resumption information to said waiting first mobile machine by using said down link control channel to resume the communication of the non-priority data.

2. A communication control method according to claim 1 wherein when said base station transmits the wait information to said first mobile machine, said base station further transmits a period for intermittently receiving said down link control channel.

3. A communication control method according to claim 2 wherein said waiting first mobile machine receives an access channel of an adjacent base station, which is adjacent to said base station, by utilizing an idle time during the intermittent reception of said down link control channel to acquire control channel idle information of said adjacent base station, and when the idle control channel of said adjacent base station is available, said first mobile machine switches from said base station to said adjacent base station.

4. A communication control method according to claim 2 wherein said waiting first mobile machine receives an access channel of an adjacent base station, which is adjacent to said base station, by utilizing an idle time during the intermittent reception of said down link control channel to acquire control channel idle information of said adjacent base station, and when the idle control channel of said adjacent base station is available, said first mobile machine switches from said base station to said adjacent base station after transmission of base station movement information to said base station which transmits the wait information.

5. A communication control method between a base station and first and second mobile machines when said second mobile machine requests communication of priority data with said base station while said first mobile machine conducts communication of non-priority data with said base station, comprising the steps in said base station of:

transmitting wait information to said first mobile machine by using a first down link control channel to control said first mobile machine to a waiting state and allocating said first down link control channel to said second mobile machine to control said second mobile machine to conduct the communication of the priority data; and when a second down link control channel different from said first down link control channel is idle, controlling said second mobile machine to a waiting state for only one frame and transmitting slot movement information to said waiting first mobile machine to resume the communication by using said second down link control channel to resume the communication of the non-priority data.

6. A communication control method according to claim 5 wherein when said base station transmits the wait information to said first mobile machine, said base station further transmits a period for intermittently receiving said first down link control channel.

7. A communication control method according to claim 6 wherein said waiting first mobile machine receives an access channel of an adjacent base station, which is adjacent to said base station, by utilizing an idle time during the intermittent reception of said first down link control channel to acquire control channel idle information of said adjacent base station, and when the idle control channel of said adjacent base station is available, said first mobile machine switches from said base station to said adjacent base station.

8. A communication control method according to claim 6 wherein said waiting first mobile machine receives an access channel of an adjacent base station, which is adjacent to said base station, by utilizing an idle time during the intermittent reception of said first down link control channel to acquire control channel idle information of said adjacent base station, and when the idle control channel of said adjacent base station is available, said first mobile machine switches from said base station to said adjacent base station after the transmission of base station movement information to said base station which transmitted the wait information.

9. A communication control method between a base station and first and second mobile machines when said second mobile machine requests communication of priority data with said base station while said first mobile machine conducts communication of non-priority data with said base station, comprising the steps in said base station of:

transmitting wait information to said first mobile machine by using a first down link control channel to control said first mobile machine to a waiting state and allocating said first down link control channel to said second mobile machine to control said second mobile machine to conduct the communication of the priority data; and when a second down link control channel different from said first down link control channel is idle, transmitting slot movement information to said waiting first mobile machine by using said first down link control channel;

wherein when said waiting first mobile machine receives the slot movement information, said first mobile machine resumes the communication of the non-priority data in a next frame by using said second down link control channel.

10. A communication control method according to claim 9 wherein when said base station transmits the wait information to said first mobile machine, said base station further transmits a period for intermittently receiving said first down link control channel.

11. A communication control method according to claim 10 wherein said waiting first mobile machine receives an access channel of an adjacent base station, which is adjacent to said base station, by utilizing an idle time during the intermittent reception of said first down link control channel to acquire control channel idle information of said adjacent base station, and when the idle control channel of said adjacent base station is available, said first mobile machine switches from said base station to said adjacent base station.

12. A communication control method according to claim 10 wherein said waiting first mobile machine receives an access channel of an adjacent base station, which is adjacent to said base station, by utilizing an idle time during the intermittent reception of said first down link control channel to acquire control channel idle information of said adjacent base station, and when the idle control channel of said adjacent base station is available, said first mobile machine switches from said base station to said adjacent base station after transmission of base station movement information to said base station which transmitted the wait information.

* * * * *